United States Patent
Yang et al.

(10) Patent No.: US 11,536,076 B2
(45) Date of Patent: Dec. 27, 2022

(54) DOOR OPENING AND CLOSING APPARATUS

(71) Applicants: HYUNDAI MOTOR COMPANY, Seoul (KR); KIA MOTORS CORPORATION, Seoul (KR); LS AUTOMOTIVE TECHNOLOGIES CO., LTD., Anyang-si (KR)

(72) Inventors: Seung Jun Yang, Seoul (KR); Moon Gyu Choi, Incheon (KR)

(73) Assignees: HYUNDAI MOTOR COMPANY, Seoul (KR); KIA MOTORS CORPORATION, Seoul (KR); LS AUTOMOTIVE TECHNOLOGIES CO., LTD., Anyang-si (KR)

( * ) Notice: Subject to any disclaimer, the term of this patent is extended or adjusted under 35 U.S.C. 154(b) by 214 days.

(21) Appl. No.: 17/024,936

(22) Filed: Sep. 18, 2020

(65) Prior Publication Data

US 2021/0381297 A1    Dec. 9, 2021

(30) Foreign Application Priority Data

Jun. 4, 2020  (KR) .......................... 10-2020-0067535

(51) Int. Cl.
  *E05F 15/646*   (2015.01)
  *B60J 5/06*   (2006.01)
  *B60K 15/05*   (2006.01)

(52) U.S. Cl.
  CPC .............. *E05F 15/646* (2015.01); *B60J 5/06* (2013.01); *B60K 15/05* (2013.01); *E05Y 2900/531* (2013.01)

(58) Field of Classification Search
  CPC .......... E05F 15/646; B60J 5/06; B60K 15/05; E05Y 2900/531
  USPC ....................................... 296/97.22
  See application file for complete search history.

(56) References Cited

U.S. PATENT DOCUMENTS

2005/0194810 A1* 9/2005 Beck ...................... B60K 15/05
                                                  296/97.22

FOREIGN PATENT DOCUMENTS

DE         102016110869 A1 * 12/2017    ............. B60K 15/05

* cited by examiner

*Primary Examiner* — Mahmoud Gimie
(74) *Attorney, Agent, or Firm* — Morgan, Lewis & Bockius LLP

(57) ABSTRACT

A door opening and closing apparatus includes: a body defining an opening and an interior space, the opening being open toward the outside of a vehicle body and the interior space defined inside the vehicle body so as to be connected to the opening; a door configured to open and close the opening; a guide part disposed in the interior space and guiding the door such that the door moves in a first direction and a direction opposite to the first direction, the first direction being a direction from the outside of the vehicle body to the inside of the vehicle body; and a transport part disposed in the interior space and that moves the door in a second direction and a direction opposite to the second direction.

11 Claims, 9 Drawing Sheets

DOOR OPENING AND CLOSING APPARATUS

CROSS-REFERENCE TO RELATED APPLICATION

This application claims the benefit of priority to Korean Patent Application No. 10-2020-0067535, filed in the Korean Intellectual Property Office on Jun. 4, 2020, the entire contents of which are incorporated herein by reference.

TECHNICAL FIELD

The present disclosure relates to a door opening and closing apparatus.

BACKGROUND

In general, an electric vehicle that uses electricity as an energy source has a charge port for charging a battery in the vehicle. The charge port is usually blocked by a charge port door, and when the battery needs to be charged, the charge port is opened by moving the charge port door. Thereafter, a charging connector is inserted into the opened charge port to charge the battery.

In the era of autonomous vehicles, a system will be built which allows a vehicle to detect a deficiency in electric power, travel to an Electric Vehicle (EV) charging station, charge a battery in the vehicle, and return to the original location even though an occupant does not drive the vehicle. The charge port door of the vehicle needs to be able to be automatically opened.

In this case, while being opened for charging, the charge port door should not be scratched due to interference, and when a charging connector enters a charge port, interference by the charge port door should not occur.

However, because charge port doors of electric vehicles in the related art are mainly opened outward from the vehicles, parts may be damaged when the charge port doors are opened, and interference is more like to occur when a charging connector having electric wires connected thereto enters.

The information included in this Background section is only for enhancement of understanding of the general background of the present disclosure and may not be taken as an acknowledgement or any form of suggestion that this information forms the prior art already known to a person skilled in the art.

SUMMARY

The present disclosure has been made to solve the above-mentioned problems occurring in the prior art while advantages achieved by the prior art are maintained intact.

An aspect of the present disclosure provides a door opening and closing apparatus for minimizing interference of a charge port door with the outside when the charge port door is opened and minimizing interference by the charge port door when a charging connector enters after the charge port door is opened.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a door opening and closing apparatus includes: a body that defines an opening and an interior space, the opening being open toward the outside of a vehicle body and the interior space defined inside the vehicle body and communicating with the opening, a door that is configured to open and close the opening, a guide part that is disposed in the interior space and that guides the door such that the door moves in a first direction and a direction opposite to the first direction, the first direction being a direction from the outside of the vehicle body to the inside of the vehicle body, and a transport part that is disposed in the interior space and that moves the door in a second direction and a direction opposite to the second direction, the second direction being a direction different from the first direction and away from the door.

When the door transitions from a first state of closing the opening to a second state of opening the opening, the door performs a first maneuver to move in the first direction by being guided by the guide part and thereafter performs a second maneuver to move in the second direction by the transport part, and when the door transitions from the second state to the first state, the door performs a third maneuver to move in the opposite direction to the second direction by the transport part and thereafter performs a fourth maneuver to move in the opposite direction to the first direction by being guided by the guide part.

The guide part may include a first guide groove and a second guide groove extending from the first guide groove. The second guide groove may extend in the second direction, and the first guide groove may be formed to be curved toward the opening from a distal end of the second guide groove on the basis of the direction opposite to the second direction. The door may include a first protrusion protruding from the door toward the guide part so as to be inserted into the first guide groove or the second guide groove.

The guide part may further include a first stopper that is disposed at a distal end of the first guide groove on the basis of the direction opposite to the first direction and that restricts a movement of the first protrusion.

The guide part may further include a second stopper that is disposed at a distal end of the second guide groove on the basis of the second direction and that restricts a movement of the first protrusion.

The door opening and closing apparatus may further include a connecting part that connects the door and the transport part and that is rotatably connected with the door and the transport part. The connecting part may include a connecting part body that connects the transport part and a second protrusion protruding from the door toward the transport part and that is connected with the second protrusion so as to be rotatable about a first axis and is connected with the transport part so as to be rotatable about a second axis parallel to the first axis.

The connecting part may further include a connecting part protrusion protruding from the connecting part body in at least one of a direction in which the first axis extends or an opposite direction thereto and an elastic member that torsionally elastically supports the connecting part protrusion to apply, to the connecting part protrusion, a force to rotate the connecting part body toward the inside of the vehicle body.

The connecting part may further include a rotation restriction part including two prongs, the rotation restriction part being disposed such that the connecting part protrusion is located between the two prongs, in which the rotation restriction part restricts the connecting part protrusion from rotating through a predetermined angle or more.

The transport part may include a column extending in the second direction and having a thread formed on an outer circumferential surface thereof, the column being rotatable about a third axis that faces the second direction and a transport part body including a transport part protrusion protruding from the transport part toward the connecting part and having the connecting part rotatably connected thereto and a groove formed to correspond to a shape of the thread. The groove may move the transport part body in the second direction and the opposite direction to the second direction as the column rotates.

The transport part may further include a drive part that is connected with the column and that supplies power to rotate the column, and the drive part may include a motor that supplies power to rotate the column, a first rotary part connected to a rotary shaft of the motor, a second rotary part that is connected to the column and that rotates in conjunction with rotation of the first rotary part, and a belt formed to surround at least parts of the first rotary part and the second rotary part such that the second rotary part rotates as the first rotary part rotates.

The guide part may further include a first stopper that restricts the fourth maneuver of the door and a second stopper that restricts the second maneuver of the door, and the motor may include a load detection sensor that obtains at least one of information about a first load or information about a second load, in which the first load is a load applied to the column due to continual rotation of the column despite a limitation in the fourth maneuver of the door by the first stopper when the door closes the opening, and the second load is a load applied to the column due to continual rotation of the column despite a limitation in the second maneuver of the door by the second stopper when the door opens the opening.

The door opening and closing apparatus may further include a display that displays information relating to charging and that is coupled to a surface of the body that is located to face outward from the vehicle body.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
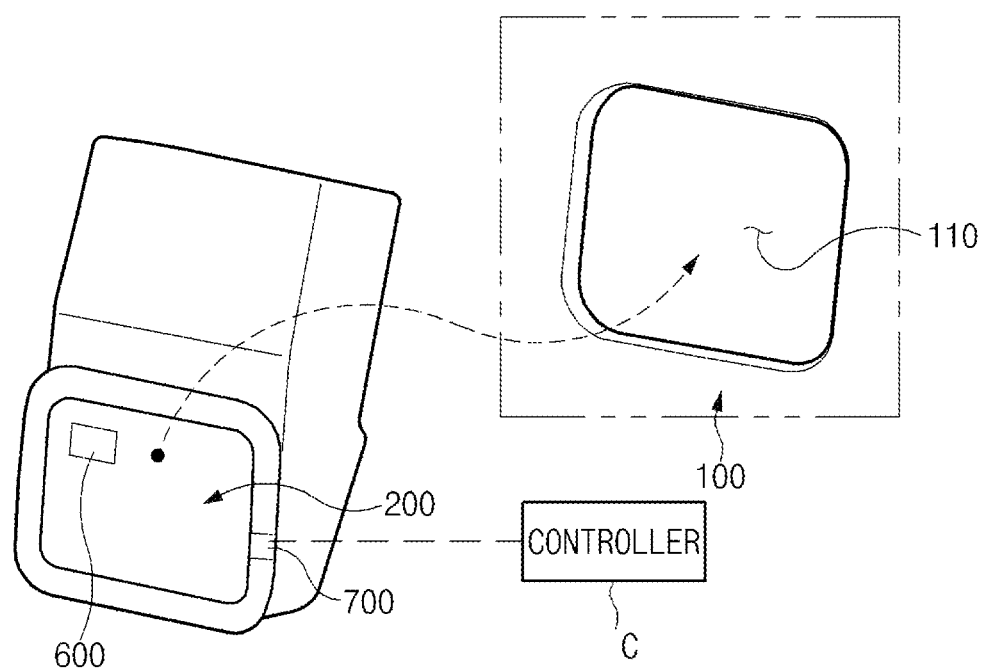
FIG. 1 is a view illustrating a body and a door of a door opening and closing apparatus according to an embodiment of the present disclosure.

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions will be ruled out in order not to unnecessarily obscure the gist of the present disclosure.

<Specific Structure of Door Opening and Closing Apparatus>

Figure 2:
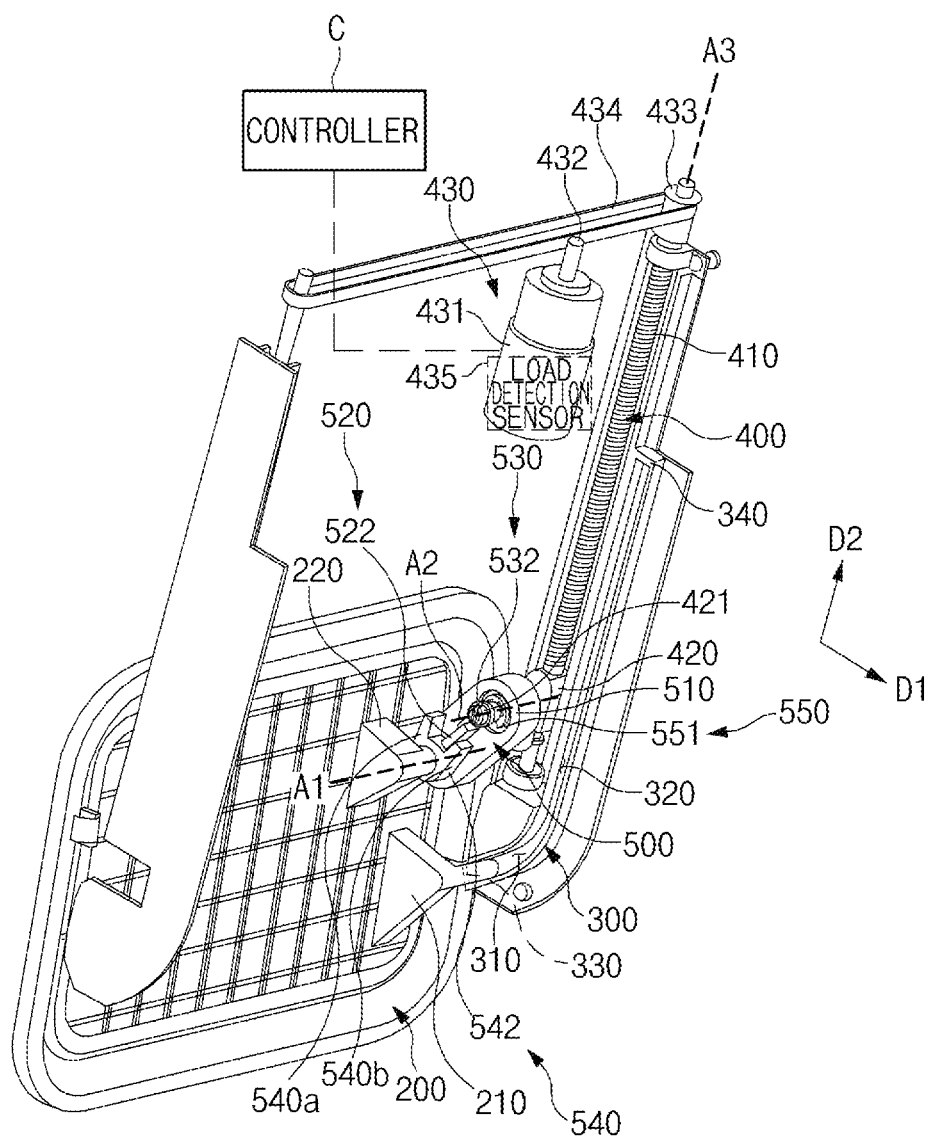
FIG. 2 is a view illustrating the door opening and closing apparatus according to the embodiment of the present disclosure.

A door opening and closing apparatus according to an embodiment of the present disclosure relates to a door opening and closing apparatus capable of being used for a charge port or a fuel intake of a vehicle. As illustrated in FIGS. 1 and 2, a door opening and closing apparatus according to an embodiment of the present disclosure includes a body 100, a door 200, a guide part 300, and a transport part 400. FIG. 1 is a view illustrating the body and the door of the door opening and closing apparatus according to the embodiment of the present disclosure. FIG. 2 is a view illustrating the door opening and closing apparatus according to the embodiment of the present disclosure. For reference, a part corresponding to a vehicle body is not illustrated in FIG. 2 and the other drawings.

The body 100 may define an opening 110 and an interior space. The opening 110 may be open in a direction toward the outside of the vehicle body. The interior space may be formed inside the vehicle body so as to be connected to the opening 110. In a case where an electric vehicle using electricity as a power source needs to be charged, a charging connector located outside the vehicle may enter the interior space through the opening 110. Thereafter, the charging connector may be inserted into a charging socket in the interior space to perform charging.

Furthermore, in a case where a vehicle using oil as a power source needs to be charged, a fuel dispenser located outside the vehicle may enter the interior space through the opening 110. Thereafter, the fuel dispenser may be inserted into a fuel intake in the interior space to fuel the vehicle. For convenience of description, it will be exemplified that the door opening and closing apparatus is used in the electric vehicle. However, the door opening and closing apparatus according to the embodiment of the present disclosure may be applied to the vehicle that uses oil as a power source. In this case, the charging socket may correspond to the fuel intake, and the charging connector may correspond to the fuel dispenser.

The door 200 may open and close the opening 110. The door 200 may include a portion formed to correspond to the shape of the opening 110. In a case where the door 200 closes the opening 110, the charging connector cannot enter the interior space, and in a case where the door 200 opens the opening 110, the charging connector can enter the interior space.

The guide part 300 may be disposed in the interior space. The guide part 300 may guide the door 200 such that the door 200 is moved in a first direction D1 and an opposite direction thereto. The first direction D1 may refer to a direction from the outside of the vehicle body toward the inside of the vehicle body.

The transport part 400 may be disposed in the interior space. The transport part 400 may move the door 200 in a second direction D2 and an opposite direction thereto. The second direction D2 may refer to a direction that is different from the first direction D1 and is away from the door 200. In FIG. 2, the second direction D2 is illustrated as being oriented in an upper direction. However, this is illustrative, and any of the up, down, left, and right directions may be used as the second direction D2 without limitation as long as it is different from the first direction D1 and away from the door 200.

Figure 3:
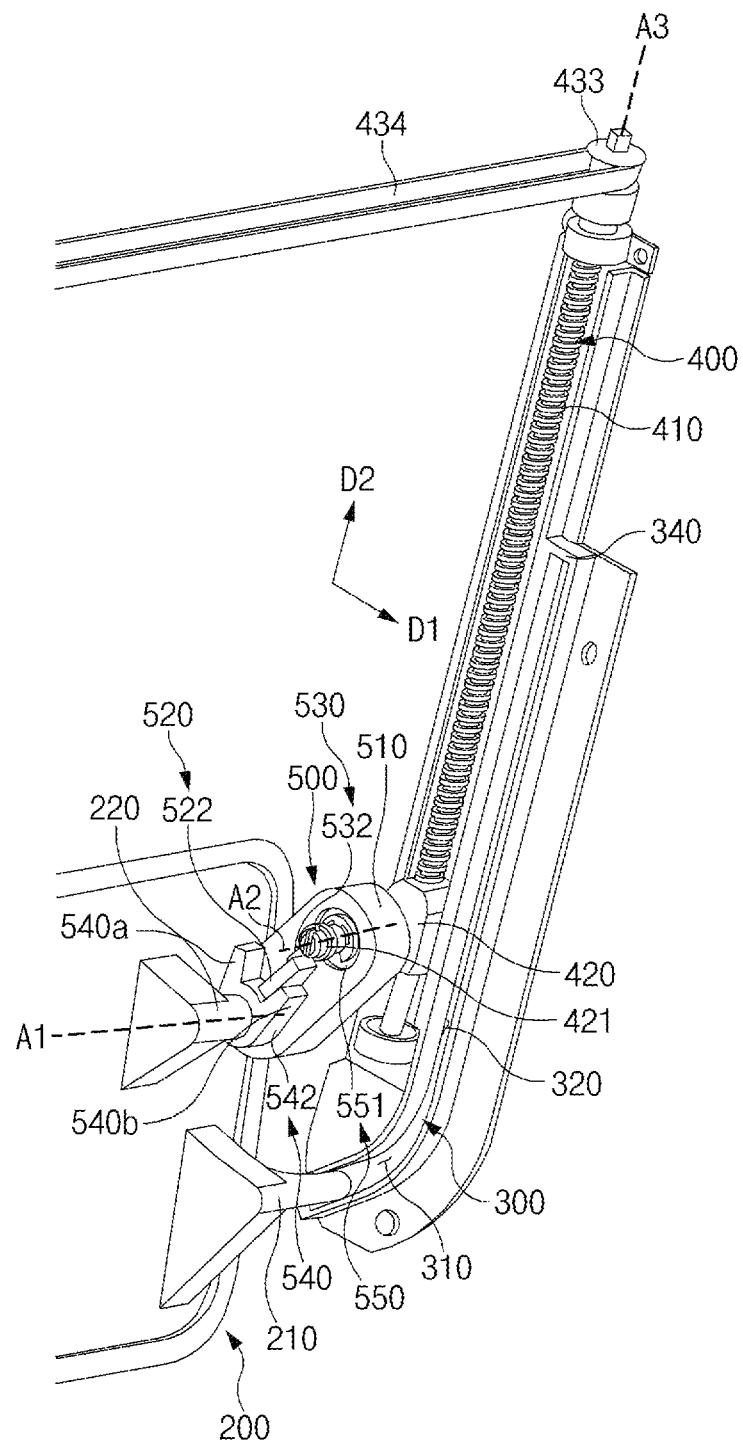
FIG. 3 is a view illustrating when the door closes an opening.
Figure 4:
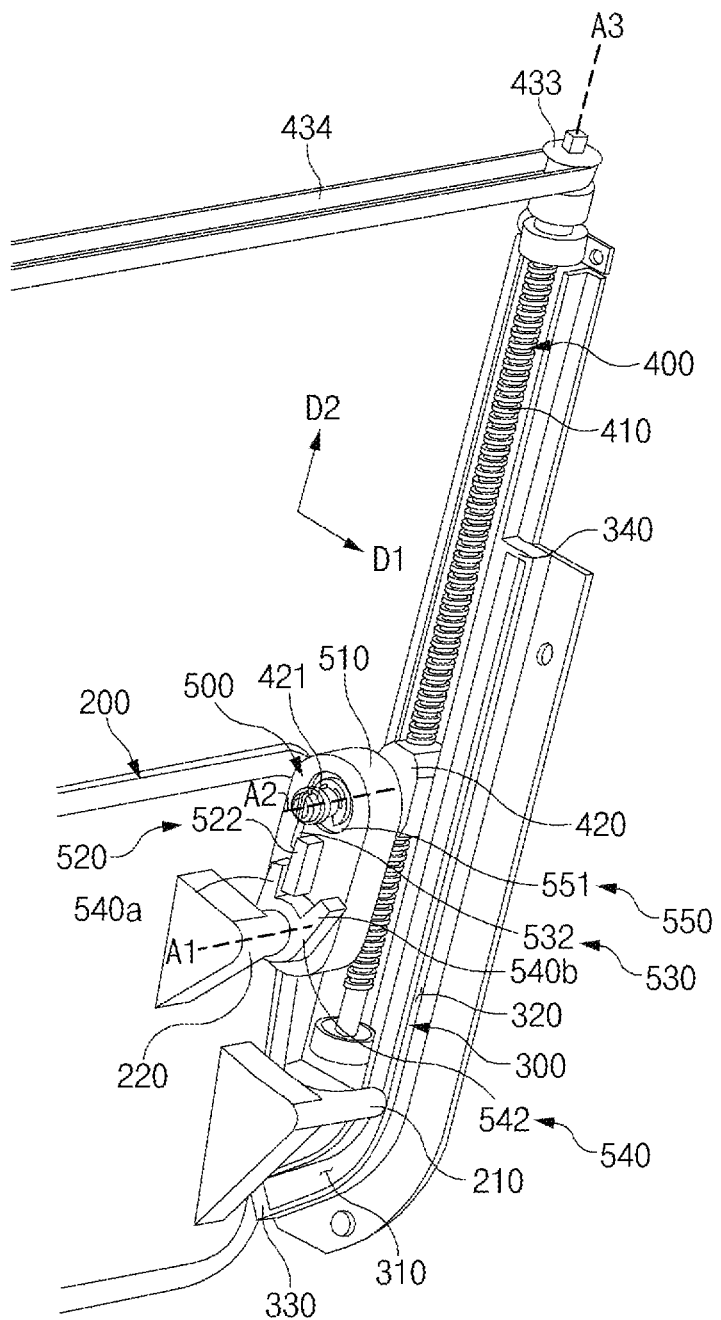
FIG. 4 is a view illustrating a state in which the door completely performs a first maneuver in a state of FIG. 3.
Figure 5:
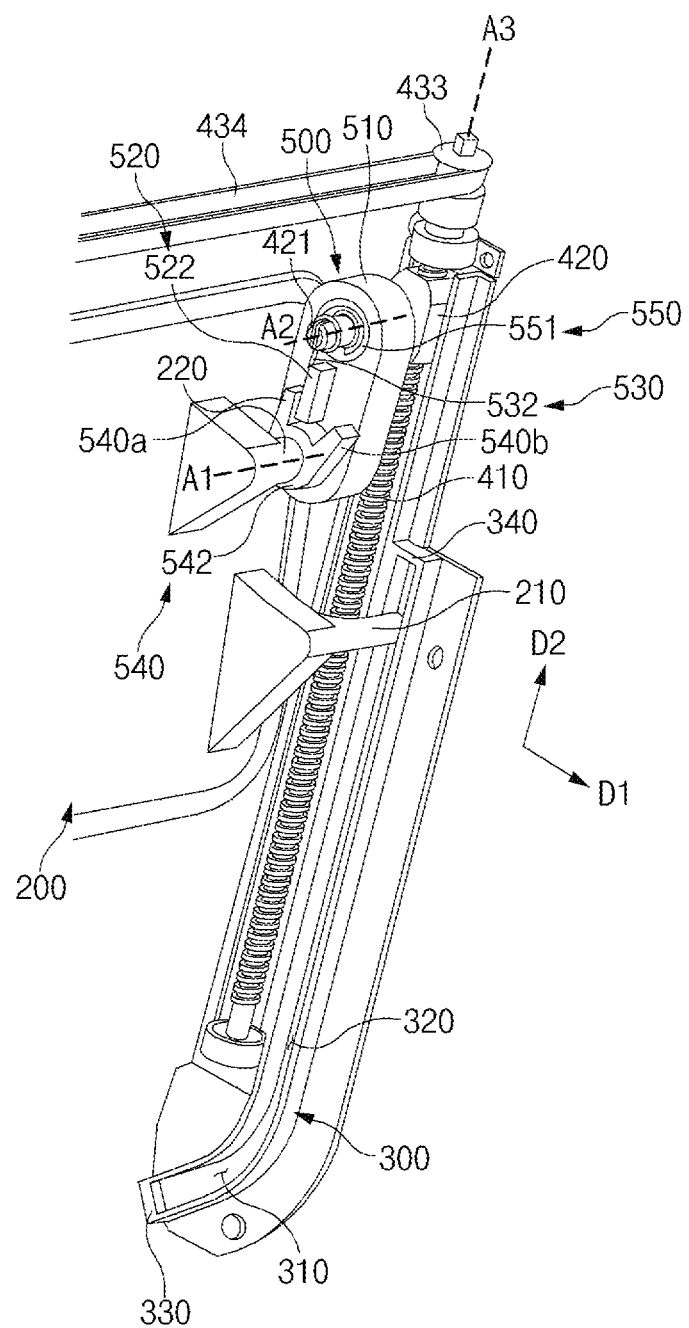
FIG. 5 is a view illustrating a state in which the door completely performs a second maneuver in a state of FIG. 4.

Hereinafter, a maneuver of the door 200 will be described in detail with reference to FIGS. 3 to 5. FIG. 3 is a view illustrating when the door 200 closes the opening 110. FIG. 4 is a view illustrating a state in which the door 200 completely performs a first maneuver in the state of FIG. 3. FIG. 5 is a view illustrating a state in which the door 200 completely performs a second maneuver in the state of FIG. 4.

The door 200, when transitioning from a first state to a second state, may perform the second maneuver after the first maneuver. The first state may refer to a state in which the door 200 closes the opening 110, and the second state may refer to a state in which the door 200 opens the opening 110. The first maneuver may refer to a maneuver that the door 200 performs in the first direction D1 by being guided by the guide part 300. That is, the first maneuver is a maneuver by which the door 200 transitions from the state of FIG. 3 to the state of FIG. 4. The second maneuver may refer to a maneuver that the door 200 performs in the second direction D2 by the transport part 400. That is, the second maneuver is a maneuver by which the door 200 transitions from the state of FIG. 4 to the state of FIG. 5.

The door 200, when transitioning from the second state to the first state, may perform a fourth maneuver after a third maneuver. The third maneuver may refer to a maneuver that the door 200 performs in the opposite direction to the second direction D2 by the transport part 400. That is, the third maneuver may refer to a maneuver performed in opposition to the second maneuver. The third maneuver may be a maneuver by which the door 200 transitions from the state of FIG. 5 to the state of FIG. 4. The fourth maneuver may refer to a maneuver that the door 200 performs in the opposite direction to the first direction D1 by being guided by the guide part 300. That is, the fourth maneuver may refer to a maneuver performed in opposition to the first maneuver. The fourth maneuver may be a maneuver by which the door 200 transitions from the state of FIG. 4 to the state of FIG. 3.

Because charge port doors of electric vehicles in the related art are mainly opened outward from the vehicles, parts may be damaged when the charge port doors are opened, and interference is more like to occur when a charging connector having electric wires connected thereto enters.

According to the present disclosure, when the door 200 opens the opening 110, the door 200 is opened in such a manner that the door 200 is moved into the interior space of the vehicle body. Accordingly, interference of the door 200 with the outside of the vehicle body may be minimized. Furthermore, according to the present disclosure, when the door 200 opens the opening 110, the door 200 is opened in such a manner that the door 200 performs the first maneuver toward the inside of the vehicle body and thereafter performs the second maneuver in a different direction from the first maneuver. Accordingly, the door 200 may not block the charging socket, and thus interference by the door 200 may be minimized when the charging connector enters the charge port.

<Guide Grooves 310 and 320 and First Protrusion 210>

Hereinafter, the guide part 300 and components thereof will be described in detail with reference to FIG. 2. The guide part 300 may include a first guide groove 310 and a second guide groove 320. The first guide groove 310 may be formed to be curved toward the opening 110 from a distal end of the second guide groove 320 on the basis of the direction opposite to the second direction D2. The second guide groove 320 may extend in the second direction D2 from a distal end of the first guide groove 310 on the basis of the first direction D1. That is, the first guide groove 310 and the second guide groove 320 may be connected in a shape similar to the shape of "J" as a whole.

Figure 6:
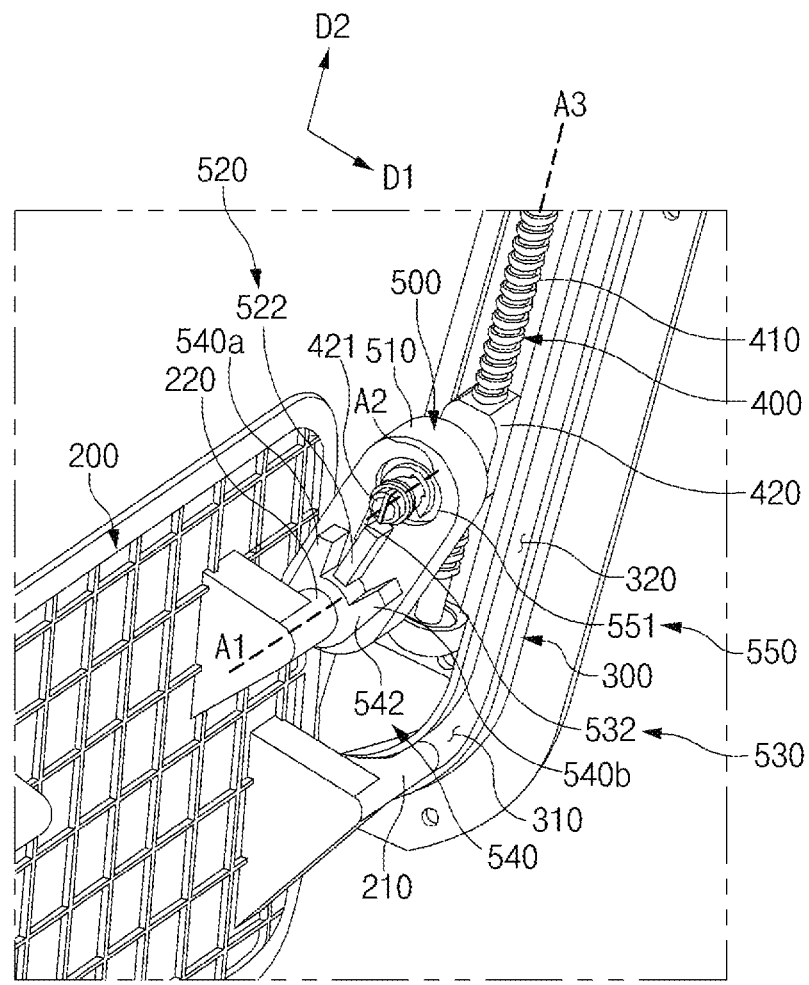
FIG. 6 is an enlarged view illustrating a portion where a first protrusion is illustrated in FIG. 2.

The door 200 may include the first protrusion 210. FIG. 6 is an enlarged view illustrating a portion where the first protrusion 210 is illustrated in FIG. 2. The first protrusion 210 may protrude from the door 200 toward the guide part 300. The first protrusion 210 may be inserted into the first guide groove 310 or the second guide groove 320 and may move along the first guide groove 310 or the second guide groove 320.

In the case of the first maneuver, the first protrusion 210 may move in the first direction D1 while being guided along the first guide groove 310. In the case of the second maneuver, the first protrusion 210 may move in the second direction D2 while being guided along the second guide groove 320. In the case of the third maneuver, the first protrusion 210 may move in the opposite direction to the second direction D2 while being guided along the second guide groove 320. In the case of the fourth maneuver, the first protrusion 210 may move in the opposite direction to the first direction D1 while being guided along the first guide groove 310.

<First Stopper 330 and Second Stopper 340>

The guide part 300 may include the first stopper 330. The first stopper 330 may be disposed at a distal end of the first guide groove 310 on the basis of the direction opposite to the first direction D1. The first stopper 330 may restrict a movement of the first protrusion 210 in the opposite direction to the first direction D1. That is, in the case where the door 200 performs the fourth maneuver, the first stopper 330 may restrict the first protrusion 210 from deviating from the first guide groove 310.

The guide part 300 may further include the second stopper 340. The second stopper 340 may be disposed at a distal end of the second guide groove 320 on the basis of the second direction D2. The second stopper 340 may restrict a movement of the first protrusion 210 in the second direction D2. That is, in the case where the door 200 performs the second maneuver, the second stopper 340 may restrict the first protrusion 210 from deviating from the second guide groove 320.

<Connecting Part 500>

Figure 7:
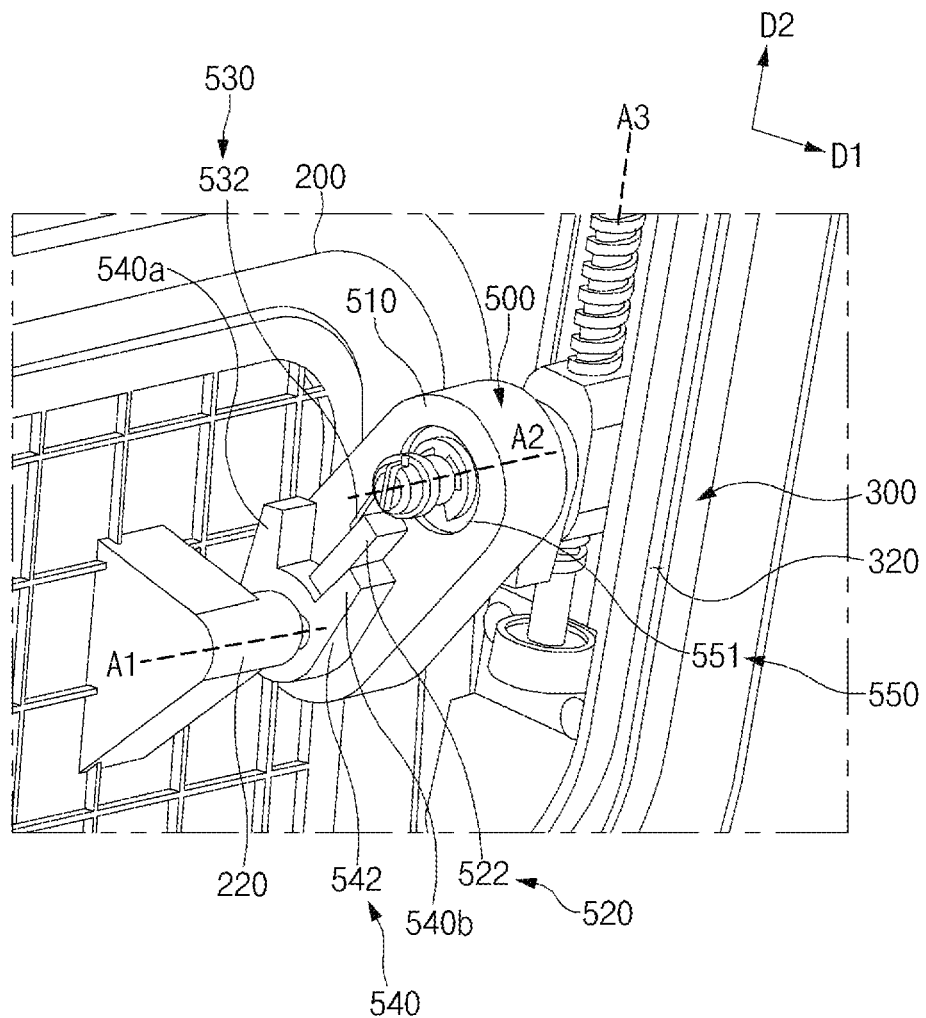
FIG. 7 is an enlarged view illustrating a portion where a connecting part is illustrated in FIG. 2.
Figure 8:
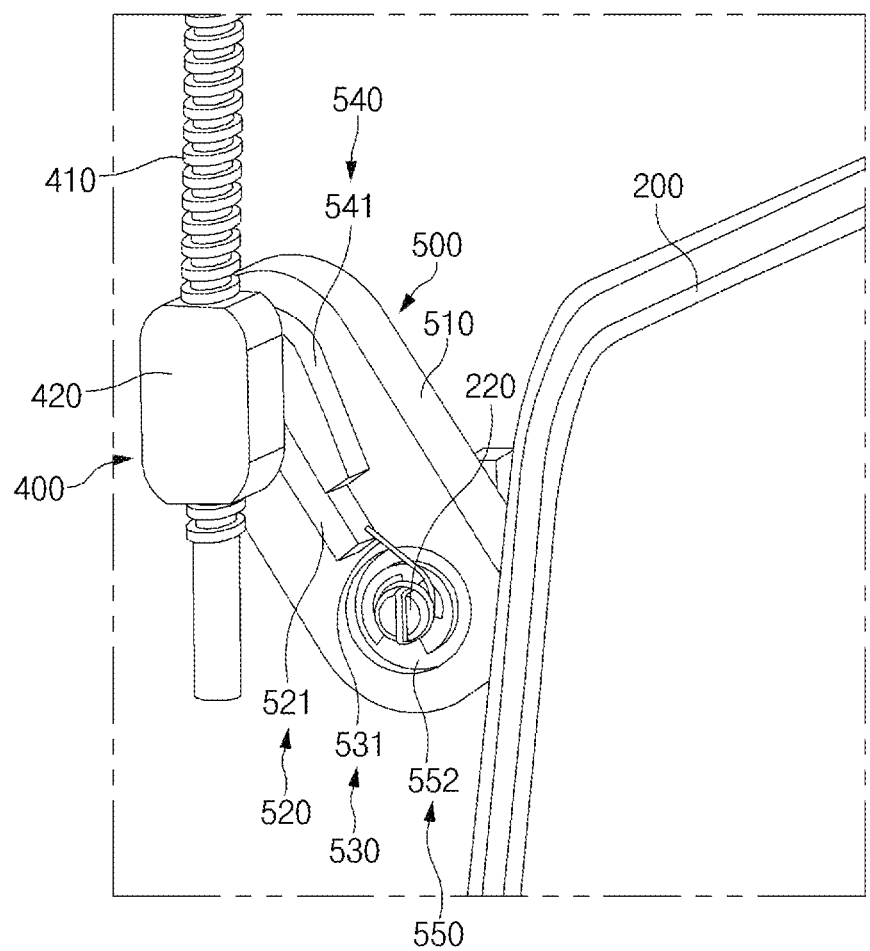
FIG. 8 is a view illustrating the door opening and closing apparatus according to the embodiment of the present disclosure when viewed at a different angle.

The door opening and closing apparatus according to the embodiment of the present disclosure may further include the connecting part 500. Hereinafter, the connecting part 500 will be described in detail with reference to FIGS. 7 and 8. FIG. 7 is an enlarged view illustrating a portion where the connecting part 500 is illustrated in FIG. 2. FIG. 8 is a view illustrating the door opening and closing apparatus according to the embodiment of the present disclosure when viewed at a different angle.

The connecting part 500 may connect the door 200 and the transport part 400 and may be rotatably connected with the door 200 and the transport part 400. When the connecting part 500 is rotatably connected with the door 200 and the transport part 400, it may mean that the door 200 and the connecting part 500 are connected so as to be rotatable relative to each other about one axis and the transport part 400 and the connecting part 500 are connected so as to be rotatable relative to each other about another axis.

The connecting part 500 may include a connecting part body 510. The connecting part body 510 may connect a second protrusion 220 and the transport part 400. The second protrusion 220 may refer to a protrusion that protrudes from the door 200 toward the transport part 400. The connecting part body 510 may connect the second protrusion 220 and the transport part 400. The connecting part body 510 may be connected with the second protrusion 220 so as to be rotatable about a first axis A1. The connecting part body 510 and the transport part 400 may be connected so as to be rotatable about a second axis A2. The second axis A2 may be an axis parallel to the first axis A1. In this case, the first axis A1 and the second axis A2 may be virtual axes rather than actually existing components.

The connecting part 500 may further include a connecting part protrusion 520 and an elastic member 530. The connecting part protrusion 520 may protrude from the connecting part body 510 in at least one of the direction in which the first axis A1 extends or the opposite direction thereto. The connecting part protrusion 520 may include a first connecting part protrusion 521 (refer to FIG. 8) that is formed on a surface of the connecting part body 510 that is located to face toward the transport part 400. The connecting part protrusion 520 may include a second connecting part protrusion 522 (refer to FIG. 7) that is formed on a surface of the connecting part body 510 that is opposite to the surface on which the first connecting part protrusion 521 is formed.

The elastic member 530 may apply, to the connecting part protrusion 520, a force to rotate the connecting part body 510 toward the inside of the vehicle body. To rotate the connecting part protrusion 520 toward the inside of the vehicle body, the elastic member 530 may torsionally elastically support the connecting part protrusion 520. The elastic member 530 may be a torsion spring. The elastic member 530 may include a first elastic member 531 that torsionally elastically supports the first connecting part protrusion 521. The elastic member 530 may include a second elastic member 532 that torsionally elastically supports the second connecting part protrusion 522.

As the elastic member 530 applies the force to rotate the connecting part body 510 toward the inside of the vehicle body to the connecting part protrusion 520, the second protrusion 220 connected with the connecting part 500 is pulled toward the inside of the vehicle body when the door 200 opens the opening 110. The direction of a force by which the second elastic member 532 is about to rotate the second connecting part protrusion 522 toward the inside of the vehicle body corresponds to the counterclockwise direction with respect to FIG. 7.

As the second protrusion 220 is pulled toward the inside of the vehicle body, the portion of the door 200 to which the second protrusion 220 is connected is pulled toward the inside of the vehicle body. Accordingly, when the door 200 is moved to open the opening 110, the portion of the door 200 where the second protrusion 220 is located may be prevented from being stopped by the body 100 to hinder the opening 110 from being opened.

Furthermore, as the second protrusion 220 is pulled toward the inside of the vehicle body when the door 200 closes the opening 110, the portion of the door 200 to which the second protrusion 220 is connected moves later than the portion of the door 200 to which the first protrusion 210 is connected. Through this movement, the portion of the door 200 to which the second protrusion 220 is connected may be prevented from being stopped by the body 100 to hinder the opening 110 from being closed, when the portion of the door 200 to which the second protrusion 220 is connected moves to close the door 200 before the portion of the door 200 to which the first protrusion 210 is connected.

<Rotation Restriction Part 540>

The connecting part 500 may further include the rotation restriction part 540. The rotation restriction part 540 may be formed to have two prongs 540a and 540b. The connecting part protrusion 520 may be disposed between the two prongs 540a and 540b. The rotation restriction part 540 may restrict the connecting part protrusion 520 from rotating through a predetermined angle or more. Here, the predetermined angle may be the angle between the two prongs 540a and 540b. As the rotation restriction part 540 restricts the rotation of the connecting part protrusion 520, the rotation of the connecting part body 510 connected to the connecting part protrusion 520 may also be restricted.

The rotation restriction part 540 may include a first rotation restriction part 541 for restricting rotation of the first connecting part protrusion 521. As illustrated in FIG. 8, the first rotation restriction part 541 may be disposed in the direction in which the surface on which the first connecting part protrusion 521 is formed is located. The first rotation restriction part 541 may be disposed on the second axis A2. The first rotation restriction part 541 may prevent the connecting part 500 from excessively rotating about a transport part protrusion 421, which will be described below, and hampering a smooth movement of the door 200.

The rotation restriction part 540 may include a second rotation restriction part 542 for restricting rotation of the second connecting part protrusion 522. As illustrated in FIG. 7, the second rotation restriction part 542 may be formed on the same surface as the surface on which the second connecting part protrusion 522 is formed. The second rotation restriction part 542 may be disposed on the first axis A1. The second rotation restriction part 542 may prevent the connecting part 500 from excessively rotating about the second protrusion 220 and hampering a smooth movement of the door 200.

<Transport Part 400>

Figure 9:
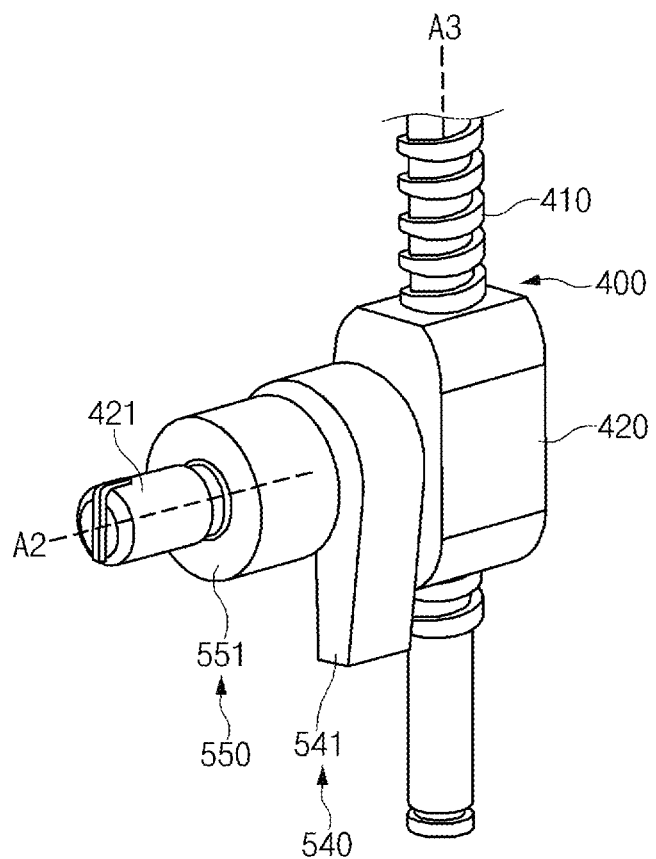
FIG. 9 is a view illustrating a column and a transport part body of a transport part of the door opening and closing apparatus according to the embodiment of the present disclosure.

The transport part 400 may include a column 410 and a transport part body 420. FIG. 9 is a view illustrating the column 410 and the transport part body 420 of the transport part 400 of the door opening and closing apparatus according to the embodiment of the present disclosure. The column 410 may extend in the second direction D2. The column 410 may have a thread formed on an outer circumferential surface thereof. The column 410 may rotate about a third axis A3. The third axis A3 may refer to an axis extending in the second direction D2. The third axis A3 may be a virtual axis rather than an actually existing component.

The transport part body 420 may include the transport part protrusion 421 and a groove. The transport part protrusion 421 may protrude from the transport part 400 toward the connecting part 500. The transport part protrusion 421 may be rotatably connected with the connecting part 500. The transport part protrusion 421 may be located on the same axis as the second axis A2. A first bearing for smooth rotation of the transport part protrusion 421 may be mounted on the transport part protrusion 421. The first bearing may be disposed closer to the transport part body 420 than the first rotation restriction part 541.

A second bearing for smooth rotation of the second protrusion 220 may be mounted on the second protrusion 220. The second bearing may be disposed closer to the transport part body 420 than the second rotation restriction part 542. That is, the first bearing and the second bearing may be disposed between the first rotation restriction part 541 and the second rotation restriction part 542.

The groove may be formed to correspond to the shape of the thread. The groove may be formed on an inner wall of a hole formed through the transport part body 420 along the second direction D2. The groove may move the transport part body 420 in the second direction D2 and the opposite direction thereto as the column 410 rotates. That is, when the thread rotates as the column 410 rotates about the third axis A3, the transport part body 420 including the groove corresponding to the shape of the thread is moved in the second direction D2 or the opposite direction to the second direction D2.

The transport part 400 may further include a drive part 430 that is connected with the column 40 and that supplies power to rotate the column 410. The drive part 430 may include a motor 431, a first rotary part 432, a second rotary part 433, and a belt 434.

The motor 431 may supply power to rotate the column 410. The motor 431 may be a general DC or AC motor powered by electrical energy.

The first rotary part 432 may be connected to a rotary shaft of the motor 431. The first rotary part 432 may be a pulley or a gear engaged with tooth forms. The first rotary part 432 may transmit rotary power of the rotary shaft of the motor 431 to the belt 434, which will be described below, to rotate the second rotary part 433, which will be described below.

The second rotary part 433 may be connected to the column 410. The second rotary part 433 may be disposed on the third axis A3. The second rotary part 433 may rotate in conjunction with rotation of the first rotary part 432. The second rotary part 433 may be operated in conjunction with the rotation of the first rotary part 432 by the belt 434 which will be described below.

To allow the second rotary part 433 to rotate as the first rotary part 432 rotates, the belt 434 may be formed to surround at least parts of the first rotary part 432 and the second rotary part 433. As illustrated in FIG. 2, the first rotary part 432 may make contact with an outer surface of the belt 434, and the second rotary part 433 may make contact with an inner surface of the belt 434. Without being limited thereto, both the first rotary part 432 and the second rotary part 433 may make contact with the outer surface or the inner surface of the belt 434, as long as the power of the first rotary part 432 is able to be transmitted to the second rotary part 433.

In a case where the first rotary part 432 is a pulley, the second rotary part 433 may be a pulley, and the belt 434 may be a flat belt 434, and in a case where the first rotary part 432 is a gear, the second rotary part 433 may be a gear, and the belt 434 may be a timing belt 434.

<Load Detection Sensor>

Hereinafter, the load detection sensor 435 will be described in detail with reference to FIG. 2. The motor 431 may include the load detection sensor 435 that obtains at least one of information about a first load or information about a second load. The load detection sensor 435 may be disposed inside the motor 431. The first load may refer to a load applied to the column 410 when the column 410 is resisted by continual rotation thereof despite a limitation in the fourth maneuver of the door 200 by the first stopper 330 in a case where the door 200 closes the opening 110. The second load may refer to a load applied to the column 410 when the column 410 is resisted by continual rotation thereof despite a limitation in the second maneuver of the door 200 by the second stopper 340 in a case where the door 200 opens the opening 110. The first load and the second load applied to the column 410 may act as a resistance to rotary power transmitted to the first rotary part 432 by the motor 431. The load detection sensor 435 may obtain and transfer at least one of the information about the first load or the information about the second load to a controller C.

The controller C may control the motor 431 to operate or stop operating, based on at least one of the information about the first load or the information about the second load obtained by the load detection sensor 435. Specifically, the controller C controls the motor 431 to operate, when it is determined that the first load or the second load obtained by the load detection sensor 435 is less than a predetermined reference load. Thereafter, the controller C may control the motor 431 to stop operating, when it is determined that the first load or the second load obtained by the load detection sensor 435 is greater than or equal to the predetermined reference load. The controller C may be electrically connected with the motor 431.

The controller C may include a processor and a memory. The processor may include a microprocessor such as a field programmable gate array (FPGA), an application specific integrated circuit (ASIC), a central processing unit (CPU), or the like. The memory may store control instructions on the basis of which the processor generates instructions for determining whether the motor 431 operates. The memory may be a data store such as a hard disk drive (HDD), a solid state drive (SSD), a volatile medium, a non-volatile medium, or the like.

The door opening and closing apparatus according to the embodiment of the present disclosure may further include a display 600. The display 600 may be coupled to a surface of the body 100 that is located to face outward from the vehicle body. The display 600 may display information relating to charging. The charging-related information may include information about whether charging is performed or not, information about time left until completion of charging, information about a battery residual amount, and the like.

The door opening and closing apparatus according to the embodiment of the present disclosure may further include an opening and closing button 700. The opening and closing button 700 may be coupled to the surface of the body 100 that is located to face outward from the vehicle body. The opening and closing button 700 may obtain and transfer a user input associated with opening and closing the door 200 to the controller C. The user input associated with opening and closing the door 200 may include an input for opening the door 200, an input for closing the door 200, or the like.

The controller C may open or close the opening 110 by controlling the door 200, based on the user input obtained by the opening and closing button 700. The opening and closing button 700 may be a general push button switch that can be pressed. The opening and closing button 700 may be of a touch screen type.

<Operation to Open Opening 110>

Hereinafter, the operation to open the opening 110 of the door opening and closing apparatus according to the embodiment of the present disclosure will be described in detail with reference to FIGS. 3 to 5.

First, the controller C obtains a command to open the opening 110 and operates the motor 431 to open the opening 110. The command to open the opening 110 may be generated by pressing the opening and closing button 700, or may be a separate command generated by an interaction with another device.

Next, as the first rotary part 432 connected to the motor 431 rotates, the second rotary part 433 to which rotary power is transmitted from the belt 434 rotates, and the column 410 connected to the second rotary part 433 rotates.

Then, as the column 410 rotates, the transport part body 420 is forced to move along the second direction D2. Accordingly, the connecting part body 510 connected to the transport part protrusion 421 is also forced to move along the second direction D2.

After that, the first protrusion 210 starts to be guided in the first direction D1 along the first guide groove 310 as the connecting part body 510 is forced to move along the second direction D2. That is, the door 200 performs the first maneuver. In other words, the portion of the door 200 where the first protrusion 210 is located is pulled toward the inside of the vehicle body. At this time, the elastic member 530 presses the connecting part protrusion 520 toward the inside of the vehicle body. Therefore, the connecting part body 510 rotates toward the inside of the vehicle body, and the portion of the door 200 where the second protrusion 220 is located is moved together toward the inside of the vehicle body.

Thereafter, the first protrusion 210 starts to be guided along the second guide groove 310 after passing through the first guide groove 310 as the transport part body 420 continues to move along the second direction D2. That is, the door 200 performs the second maneuver. At this time, rotation of the connecting part protrusion 520 is restricted by the rotation restriction part 540, and therefore the portion of the door 200 where the second protrusion 220 is located is no longer pulled toward the inside of the vehicle body.

Thereafter, when the first protrusion 210 meets the second stopper 340, the first protrusion 210 cannot move in the second direction D2 any more due to the second stopper 340. Accordingly, a resisting force is generated in the opposite direction to the force by which the column 410 is about to rotate, and therefore the second load is generated. The second load is obtained by the load detection sensor 435 and is transferred to the controller C.

Finally, in a case where the second load exceeds the predetermined reference load, the controller C stops operation of the motor 431, and accordingly the operation to open the opening 110 is completed.

<Operation to Close Opening 110>

Hereinafter, the operation to close the opening 110 of the door opening and closing apparatus according to the embodiment of the present disclosure will be described in detail with reference to FIGS. 3 to 5.

First, the controller C obtains a command to close the opening 110 and operates the motor 431 to close the opening 110. The command to close the opening 110 may be generated by pressing the opening and closing button 700, or may be a separate command generated by an interaction with another device.

Next, as the first rotary part 432 connected to the motor 431 rotates in the opposite direction to the direction in which the first rotary part 432 rotates to open the opening 110, the second rotary part 433 to which rotary power is transmitted from the belt 434 rotates, and the column 410 connected to the second rotary part 433 rotates.

Then, as the column 410 rotates, the transport part body 420 is forced to move along the opposite direction to the second direction D2. Accordingly, the connecting part body 510 connected to the transport part protrusion 421 is also forced to move along the opposite direction to the second direction D2.

After that, the first protrusion 210 starts to be guided in the opposite direction to the second direction D2 along the second guide groove 310 as the connecting part body 510 is forced to move along the opposite direction to the second direction D2. That is, the door 200 performs the third maneuver.

Thereafter, the first protrusion 210 starts to be guided along the first guide groove 310 after passing through the second guide groove 310 as the transport part body 420 continues to move along the opposite direction to the second direction D2. That is, the door 200 performs the fourth maneuver. In other words, the portion of the door 200 where the first protrusion 210 is located is pushed toward the outside of the vehicle body. At this time, the elastic member 530 presses the connecting part protrusion 520 toward the inside of the vehicle body, and accordingly the portion of the door 200 where the second protrusion 220 is located performs the fourth maneuver in a state of being inclined toward the inside of the vehicle body, compared to the portion of the door 200 where the first protrusion 210 is located.

Thereafter, when the first protrusion 210 meets the first stopper 330, the first protrusion 210 cannot move toward the outside of the vehicle body any more due to the first stopper 330. Accordingly, a resisting force is generated in the opposite direction to the force by which the column 410 is about to rotate, and therefore the first load is generated. The first load is obtained by the load detection sensor 435 and is transferred to the controller C. The first protrusion 210 may serve as an axis of rotation of the door 200 at the same time that a movement of the first protrusion 210 is restricted by the first stopper 330. Because the transport part body 420 tries to continually move in the opposite direction to the second direction D2 as the column 410 continues to rotate, the force by which the transport part body 420 is about to move in the opposite direction to the second direction D2 becomes larger than the force by which the elastic member 530 presses the connecting part protrusion 520 toward the inside of the vehicle body. The portion of the door 200 where the second protrusion 220 is located rotates toward the outside of the vehicle body, with the first protrusion 210 as an axis of rotation. As the portion of the door 200 where the second protrusion 220 is located and that is inclined toward the inside of the vehicle body rotates toward the outside of the vehicle body, the opening 110 may be completely closed.

Finally, in a case where the first load exceeds the predetermined reference load, the controller C stops operation of the motor 431, and accordingly the operation to close the opening 110 is completed.

According to the present disclosure, when the door opens the charge port, the door is opened in such a manner that the door is moved into the interior space of the vehicle body. Thus, interference of the door with the outside of the vehicle body may be minimized.

In addition, according to the present disclosure, when the door opens the charge port, the door is opened in such a manner that the door performs the first maneuver toward the inside of the vehicle body and thereafter performs the second maneuver in the different direction from that of the first maneuver. Accordingly, the door does not block the charging socket, and thus interference by the door may be minimized when the charging connector enters the charge port.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims. Therefore, the exemplary embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

What is claimed is:

1. A door opening and closing apparatus comprising:
    a body configured to define an opening and an interior space, wherein the opening is configured to be open toward an outside of a vehicle body, and the interior space is defined inside the vehicle body and communicates with the opening;
    a door configured to open and close the opening;
    a guide part disposed in the interior space and configured to guide the door such that the door moves in a first direction and a direction opposite to the first direction, wherein the first direction is a direction from the outside of the vehicle body to the inside of the vehicle body; and
    a transport part disposed in the interior space and configured to move the door in a second direction and a direction opposite to the second direction, wherein the second direction is a direction different from the first direction and away from the door,
    wherein, when the door transitions from a first state of closing the opening to a second state of opening the opening, the door is configured to perform a first maneuver to move in the first direction by being guided by the guide part and thereafter to perform a second maneuver to move in the second direction by the transport part,
    wherein, when the door transitions from the second state to the first state, the door is configured to perform a third maneuver to move in the direction opposite to the second direction by the transport part and thereafter to perform a fourth maneuver to move in the direction opposite to the first direction by being guided by the guide part,
    wherein the guide part includes a first guide groove and a second guide groove which extends from the first guide groove, and
    wherein the door includes a first protrusion protruding from the door toward the guide part and configured to be movably inserted into the first guide groove or the second guide groove.

2. The door opening and closing apparatus of claim 1, wherein the second guide groove extends in the second direction, and
    wherein the first guide groove is configured to be curved toward the opening from a distal end of the second guide groove on the basis of the direction opposite to the second direction.

3. The door opening and closing apparatus of claim 2, wherein the guide part further includes a first stopper disposed at a distal end of the first guide groove on the basis of the direction opposite to the first direction, the first stopper configured to restrict a movement of the first protrusion.

4. The door opening and closing apparatus of claim 2, wherein the guide part further includes a second stopper disposed at a distal end of the second guide groove on the basis of the second direction, the second stopper configured to restrict a movement of the first protrusion.

5. The door opening and closing apparatus of claim 1, further comprising a connecting part configured to connect the door and the transport part, and rotatably connected with the door and the transport part,
    wherein the connecting part includes a connecting part body configured to connect the transport part and a second protrusion which protrudes from the door toward the transport part, and
    wherein the connecting part body is connected with the second protrusion so as to be rotatable about a first axis and being connected with the transport part so as to be rotatable about a second axis parallel to the first axis.

6. The door opening and closing apparatus of claim 5, wherein the connecting part further includes:
    a connecting part protrusion protruding from the connecting part body in at least one of a direction in which the first axis extends or a direction opposite to the direction in which the first axis extends; and
    an elastic member configured to torsionally elastically support the connecting part protrusion to apply, to the connecting part protrusion, a force to rotate the connecting part body toward the inside of the vehicle body.

7. The door opening and closing apparatus of claim 6, wherein the connecting part further includes a rotation restriction part including two prongs, the rotation restriction part disposed such that the connecting part protrusion is arranged between the two prongs, and
    wherein the rotation restriction part restricts the connecting part protrusion from rotating through a predetermined angle or more.

8. The door opening and closing apparatus of claim 6, wherein the transport part includes:
    a column extending in the second direction and having a thread formed on an outer circumferential surface thereof, the column being rotatable about a third axis aligned with the second direction; and
    a transport part body including a transport part protrusion protruding from the transport part toward the connecting part and having the connecting part rotatably connected thereto and a groove corresponding to a shape of the thread, and
    wherein the groove moves the transport part body in the second direction and the direction opposite to the second direction as the column rotates.

9. The door opening and closing apparatus of claim 8, wherein the transport part further includes a drive part connected with the column and configured to supply power to rotate the column, and
    wherein the drive part includes:
    a motor configured to supply power to rotate the column;
    a first rotary part connected to a rotary shaft of the motor;
    a second rotary part connected to the column and configured to rotate in conjunction with rotation of the first rotary part; and
    a belt surrounding at least parts of the first rotary part and the second rotary part such that the second rotary part rotates as the first rotary part rotates.

10. The door opening and closing apparatus of claim 9, wherein the guide part further includes:

a first stopper configured to restrict the fourth maneuver of the door; and a second stopper configured to restrict the second maneuver of the door, and wherein the motor includes a load detection sensor configured to obtain at least one of information about a first load or information about a second load, wherein the first load is configured to be applied to the column by continual rotation of the column when the door closes the opening and the first stopper limits the fourth maneuver, and wherein the second load is configured to be applied to the column by continual rotation of the column when the door opens the opening and the second stopper limits the second maneuver.

11. The door opening and closing apparatus of claim 1, further comprising:

a display configured to display information relating to charging, the display being coupled to a surface of the body that is located to face outward from the vehicle body.

* * * * *